(12) United States Patent
Chang et al.

(10) Patent No.: US 7,904,272 B2
(45) Date of Patent: Mar. 8, 2011

(54) SYSTEM AND METHOD FOR CALCULATING COORDINATE VALUES OF A MEASURING MACHINE

(75) Inventors: Chih-Kuang Chang, Taipei Hsien (TW); Wei-Qi Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 349 days.

(21) Appl. No.: 12/176,424

(22) Filed: Jul. 21, 2008

(65) Prior Publication Data

US 2009/0144018 A1    Jun. 4, 2009

(30) Foreign Application Priority Data

Nov. 30, 2007   (CN) .......................... 2007 1 0202814

(51) Int. Cl.
*G06F 15/00* (2006.01)
(52) U.S. Cl. ........... 702/155; 702/95; 702/127; 367/907; 327/7; 327/17; 327/100
(58) Field of Classification Search .................. 702/95, 702/127, 155; 367/907; 327/7, 17, 100
See application file for complete search history.

*Primary Examiner* — Sujoy K Kundu
(74) *Attorney, Agent, or Firm* — Frank R. Niranjan

(57) ABSTRACT

A method for calculating coordinate values of a measuring machine is provided. The method includes receiving signals in three dimensions from a raster ruler signal generator, identifying a direction of each signal and multiply a frequency of each signal. The method further includes counting each of multiplied signals in each dimension, sending the counted data to the MCU. The method further includes adding the counted data of each of the multiplied signals in each dimension to obtain an accumulated number in each dimension and calculating coordinate values of the measuring machine according to the accumulated number in each dimension and a proportionality factor of the raster ruler signal generator.

9 Claims, 3 Drawing Sheets

US 7,904,272 B2

SYSTEM AND METHOD FOR CALCULATING COORDINATE VALUES OF A MEASURING MACHINE

BACKGROUND

1. Field of the Invention

Embodiments of the present disclosure relate to systems and methods for generating processing data of a measuring machine, and more particularly to a system and method for calculating coordinate values of a measuring machine.

2. Description of Related Art

A measuring machine, such as a three-dimensional measuring machine or a coordinate measuring machine (CMM), is used for measuring profile and dimensions of a prototype device. During the measuring process, the measuring machine determines parameters in order to measure the profile and dimensions of the prototype, such as a coordinate value of a point on the prototype device. Thus, accuracy and speed of calculating the coordinate value of a prototype device affects an accuracy and a speed of measuring the prototype.

Accordingly, what is needed is a system and method for calculating coordinate values of a measuring machine with an improved accuracy and a higher speed.

SUMMARY

A system of an embedded system in accordance with an exemplary embodiment is provided. The system includes raster ruler signal generator, a computer sending module, a calculating module, and a micro controller unit (MCU). The computer sending module is configured for sending an instruction to a micro controller unit (MCU) to gather a plurality of signals generated by the raster ruler signal generator, wherein the plurality of signals are spread over three-dimensions of a coordinate axis system. The MCU is configured for gathering the plurality of signals generated by the raster signal generator according to the instruction, and is configured for generating an accumulated number for each signal from the plurality of signals for each dimension of the three-dimensions. The calculating module is configured for calculating coordinate values of the measuring machine according to the accumulated number in each dimension and a proportionality factor of the raster ruler signal generator.

Other systems, methods, features, and advantages will be or become apparent to one skilled in the art upon examination of the following drawings and detailed description.

DETAILED DESCRIPTION OF CERTAIN INVENTIVE EMBODIMENTS

Figure 1:
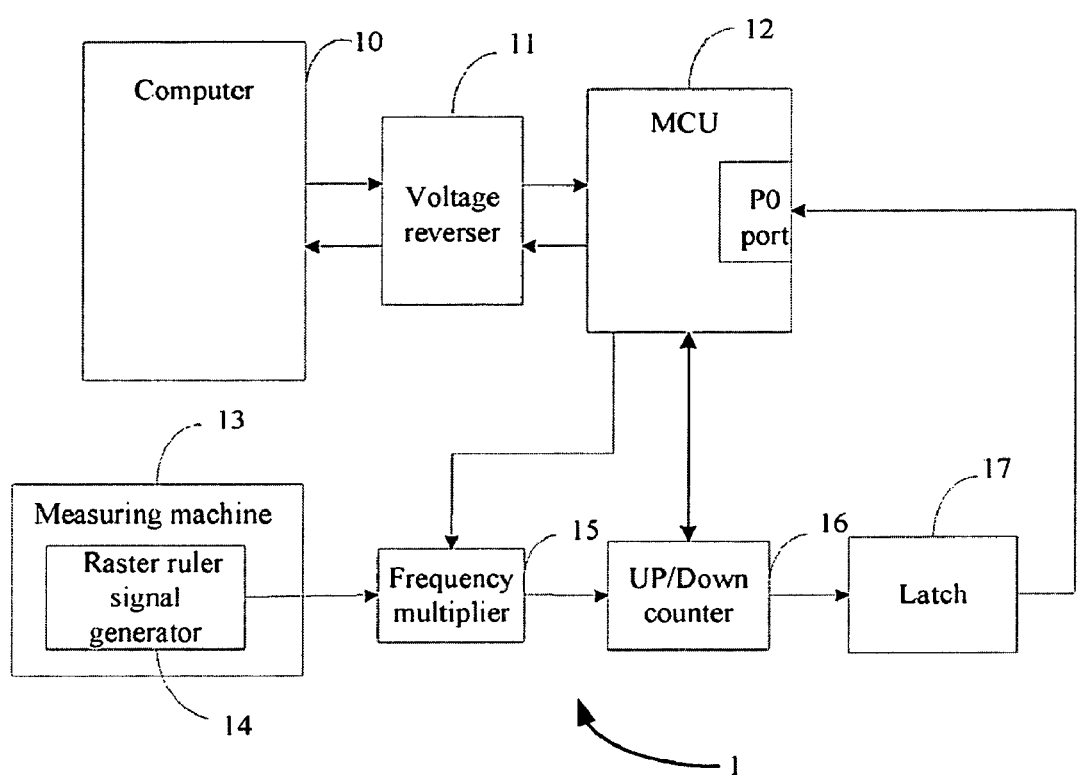
FIG. 1 is a block diagram of one embodiment of a system for calculating coordinate values of a measuring machine.

FIG. 1 is a block diagram of one embodiment of a system 1 for calculating coordinate values of a measuring machine 13. The system 1 is typically implemented by a computer 10 and a micro controller unit (MCU) 12. The MCU 12 may communicate with the computer 10 via a voltage reverser 11. The MCU 12 further communicates with a frequency multiplier 15, an up/down counter 16 and a latch 17. The frequency multiplier 15 connects with a raster ruler signal generator 14 which is installed on the measuring machine 13.

The voltage reverser 11 is configured for changing a negative voltage from the computer 10 to a positive voltage to be received by the MCU 12.

The raster ruler signal generator 14 is configured for generating a plurality of signals in three dimensions when the measuring machine 13 moves. The plurality of signals may be spread over three-dimensions of a coordinate axis system (e.g., X, Y, Z).

The MCU 12 is configured for gathering the plurality of signals generated by the raster signal generator 14, and configured for generating an accumulated number in each dimension of the three-dimensions of the coordinate axis system for each of the plurality of signals gathered.

The frequency multiplier 15 is configured for identifying a direction of each of the plurality of signals generated by the raster signal generator 14, and is further configured for multiplying a frequency of each of the plurality of signals to meet a precision of the up/down counter 16. The frequency multiplier 15 is configured to multiply the frequency of each of the plurality of signals by a certain positive integer "n." For example, if a frequency of one of the plurality of signals is "f", then a frequency of a corresponding signal multiplied by the frequency multiplier 15 is "n*f". The positive integer "n" is determined according to the precision of the up/down counter 16.

Figure 2:
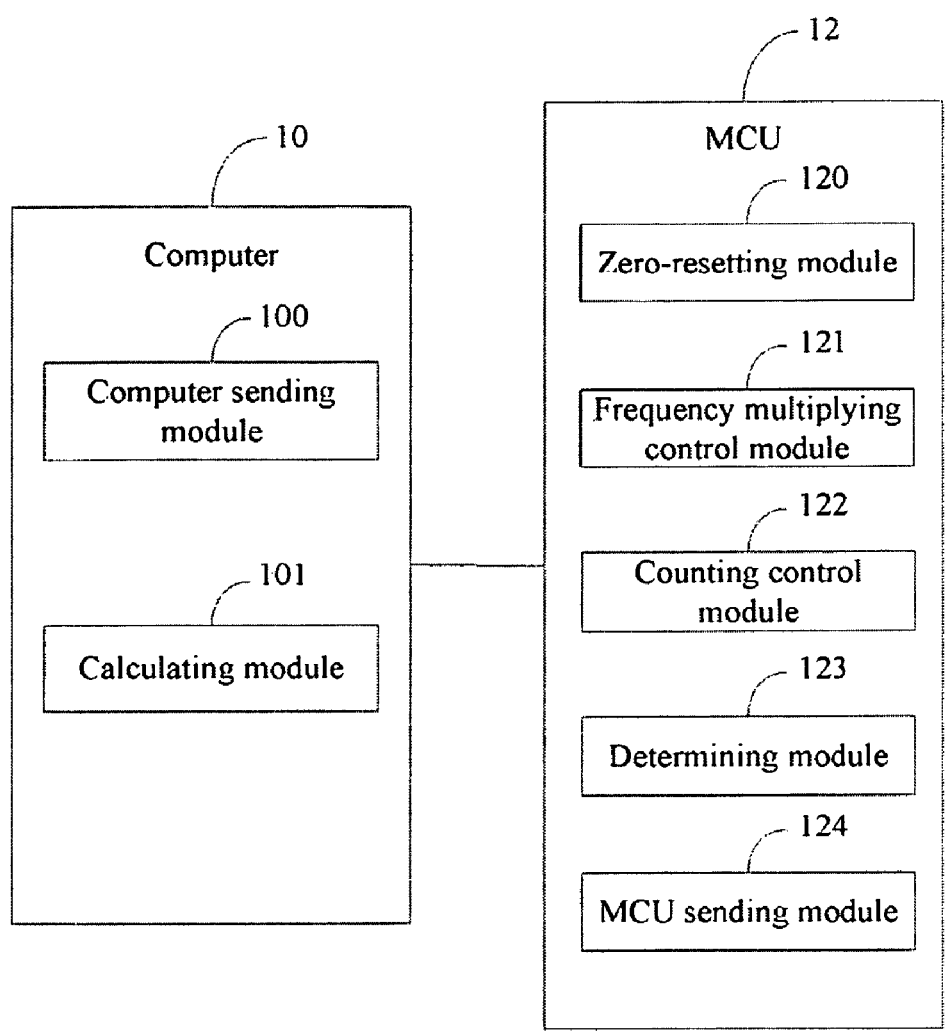
FIG. 2 is a block diagram of one embodiment of function modules of a computer and an MCU in FIG. 1.

FIG. 2 is a block diagram of one embodiment of function modules of the computer 10 and the MCU 12. In one embodiment, the computer 10 includes a computer sending module 100 and a calculating module 101. In one embodiment, the MCU 12 includes a zero-resetting module 120, a frequency multiplying control module 121, a counting control module 122, a determining module 123, and a MCU sending module 124.

The computer sending module 100 is configured for sending an instruction to the MCU 12 via the voltage reverser 11. The instruction sent is used for resetting the frequency multiplier 15 and the up/down counter 16 to gather signals generated by the raster ruler signal generator 14

The zero-resetting module 120 is configured for resetting the frequency multiplier 15 and the up/down counter 16 according to the instruction sent by the computer sending module 100.

The frequency multiplying control module 121 is configured for controlling the frequency multiplier 15 to receive signals generated by the raster ruler signal generator 14. As mentioned above, the raster ruler signal generator 14 generates signals in three dimensions according to movement of the measuring machine 13.

Furthermore, the frequency multiplying control module 121 is configured for controlling the frequency multiplier 15 to identify a direction of each of the signals received, and to multiply a frequency of each of the signals received to generate multiplied signals. In addition, the frequency multiplying control module 121 is configured for sending the multiplied signals to the up/down counter 16. In one embodiment, each of the multiplied signals can be transmitted in a forward direction or in a backward direction.

The counting control module 122 is configured for controlling the up/down counter 16 to count each of the multiplied signals sent by the frequency multiplying control module 121.

The determining module 123 is configured for determining whether a counted data of each of the multiplied signals in each dimension reaches a value of 256 or a value of −256. The counted data of each of the multiplied signals counted by the up/down counter 16 is a negative data if each of the multiplied signals is transmitted in the forward direction, and is a positive data if each of the multiplied signals is transmitted in the backward direction.

Furthermore, the counting control module 122 is configured for controlling the up/down counter 16 to send the counted data to the MCU 12 via the latch 17, if the counted data counted by the up/down counter 16 does not reach the value of 256 or the value of −256. The counting control module 122 is further configured for controlling the up/down counter 16 to send the counted data to an interrupt input port of the MCU 12 if the counted data counted by the up/down counter 16 reaches the value 256 or the value of −256.

In addition, the counting control module 122 is configured for adding the counted data of each of the multiplied signals in each dimension to obtain an accumulated number in each dimension.

The MCU sending module 124 is configured for sending the accumulated number in each dimension to the computer 10 via the voltage reverser 11.

The calculating module 101 is configured for calculating coordinate values of the measuring machine 13 according to the accumulated number in each dimension and a proportionality factor of the raster ruler signal generator 14.

Figure 3:
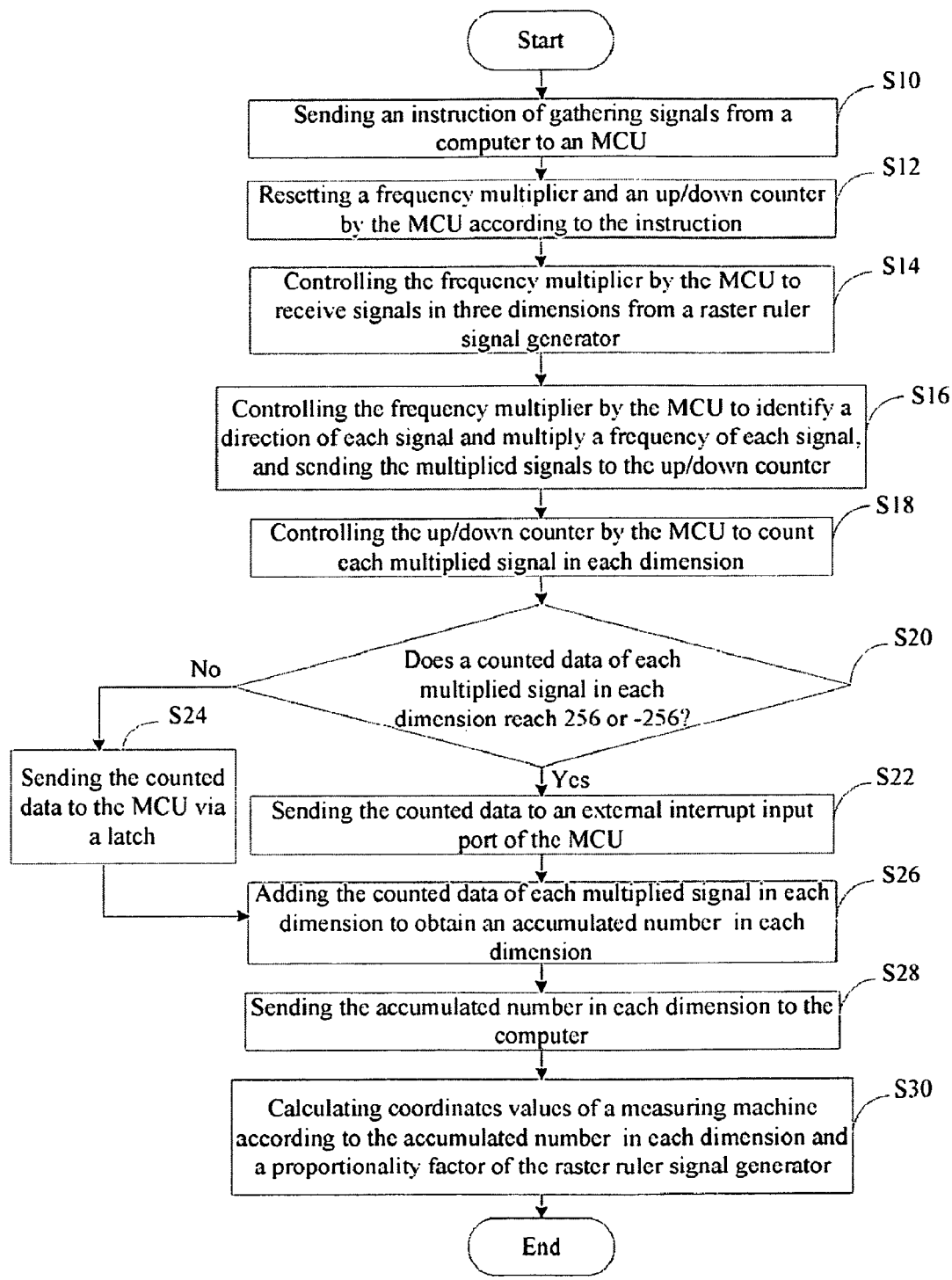
FIG. 3 is a flowchart of one embodiment of a method for calculating coordinate values of a measuring machine.

FIG. 3 is a flowchart of one embodiment of a method for calculating coordinate values of a measuring machine.

In block S10, the computer sending module 100 sends an instruction to the MCU 12 via the voltage reverser 11 to gather the plurality of signals generated by the raster ruler signal generator 14.

In block S12, the zero-resetting module 120 resets the frequency multiplier 15 and the up/down counter 16 according to the instruction sent by the computer sending module 100.

In block S14, the frequency multiplying control module 121 controls the frequency multiplier 15 to receive the plurality of signals generated by the raster ruler signal generator 14. As mentioned above, the raster ruler signal generator 14 generates signals in three dimensions according to movement of the measuring machine 13.

In block S16, the frequency multiplying control module 121 controls the frequency multiplier 15 to identify a direction of each of the signals received, and to multiply a frequency of each of the signals received to generate multiplied signals, and sends the multiplied signals to the up/down counter 16. Each of the multiplied signals can be transmitted in a forward direction or in a backward direction.

In block S18, the counting control module 122 controls the up/down counter 16 to count each of the multiplied signals sent by the frequency multiplying control module 121.

In block S20, the determining module 123 determines whether a counted data of each of the multiplied signals in each dimension reaches a value of 256 or a value of −256.

If the counted data counted by the up/down counter 16 does not reach the value of 256 or the value of −256, in block S22, the counting control module 122 controls the up/down counter 16 to send the counted data to the MCU 12 via the latch 17. Otherwise, if the counted data counted by the up/down counter 16 reaches the value 256 or the value of −256, in block S24, the counting control module 122 controls the up/down counter 16 to send the counted data to an external interrupt input port of the MCU 12.

In block S26, the counting control module 122 adds the counted data of each of the multiplied signals in each dimension to obtain an accumulated number in each dimension.

In block S28, the MCU sending module 124 sends the accumulated number in each dimension to the computer 10 via the voltage reverser 11.

In block S30, the calculating module 101 calculates coordinate values of the measuring machine 13 according to the accumulated number in each dimension and a proportionality factor of the raster ruler signal generator 14.

It should be emphasized that the above-described embodiments of the present disclosure, particularly, any "preferred" embodiments, are merely possible examples of implementations, merely set forth for a clear understanding of the principles of the present disclosure. Many variations and modifications may be made to the above-described certain inventive embodiment(s) without departing substantially from the spirit and principles of the present disclosure. All such modifications and variations are intended to be included herein within the scope of this disclosure and the above-described certain inventive embodiment(s) and protected by the following claims.

What is claimed is:

1. A system for calculating coordinate values of a measuring machine comprising a raster ruler signal generator, the system comprising:

a computer sending module configured for sending an instruction to a micro controller unit (MCU) to gather a plurality of signals generated by the raster ruler signal generator, wherein the plurality of signals are spread over three-dimensions of a coordinate axis system;

a calculating module configured for calculating coordinate values of the measuring machine;

the MCU configured for gathering the plurality of signals generated by the raster signal generator according to the instruction, and is configured for generating an accumulated number for each signal from the plurality of signals for each dimension of the coordinate axis system, the MCU comprising:

a zero-resetting module, a frequency multiplying module, a counting control module, and an MCU sending module, and a calculating module, wherein the zero-resetting module is configured for resetting a frequency multiplier and a up/down counter according to the instruction;

the frequency multiplying control module is configured for receiving the plurality of signals generated by the raster ruler signal generator, and configured for identifying a direction of each signal from the plurality of signals received by the MCU, and configured for multiplying a frequency of each of the signals received by a predetermined number so as to form a multiplied signal, and for sending multiplied signals to the up/down counter;

the counting control module is configured for counting each of the multiplied signals in each dimension of the coordinate axis system to form a counted data for each direction of the coordinate axis system;

the counting control module is further configured for sending the counted data for each dimension of the coordinate axis system to the MCU;

the counting control module is further configured for adding the counted data for each dimension of the coordinate axis system for each of the multiplied signals in each dimension to obtain an accumulated number in each dimension;

the MCU sending module is configured for sending the accumulated number in each dimension to a computer via a voltage reverser; and the calculating module is configured for calculating coordinate values of the measuring machine according to the accumulated number in each dimension and a proportionality factor of the raster ruler signal generator.

2. The system as claimed in claim 1, further comprising a determining module, wherein:

the determining module is configured for determining whether a counted data of each of multiplied signals in each dimension reaches a value of 256 or a value of −256; and the counting control module is configured for sending the counted data to the MCU via a latch if the counted data counted by the up/down counter does not reach a value of 256 or a value of −256, and for sending the counted data to an external interrupt input port of the MCU if the counted data counted by the up/down counter reaches a value of 256 or a value of −256.

3. The system as claimed in claim 1, wherein each of the signals received is transmitted in a forward direction or in a backward direction.

4. The system as claimed in claim 3, wherein the counted data of each of the multiplied signals counted by the up/down counter is a negative data if the signal is transmitted in the forward direction; and the counted data of each of the multiplied signals counted by the up/down counter is a positive data if the signal is transmitted in the backward direction.

5. A computer-implemented method for calculating coordinate values of a measuring machine comprising a raster ruler signal generator, the method comprising:

sending a gathering instruction so as to gather a plurality of signals generated by the raster ruler signal generator, wherein the plurality of signals generated are spread in three dimensions of a coordinate axis system;

resetting a frequency multiplier and an up/down counter according to the gathering instruction;

receiving the plurality of signals generated by the raster ruler signal generator;

identifying a direction of each of the plurality of signals received and multiplying a frequency of each of the signals received by a predetermined number so as to form a plurality of multiplied signals;

sending the plurality of multiplied signals to the up/down counter;

counting each of the plurality of multiplied signals in each dimension of the coordinate axis system so as to form a counted data for each of the plurality of multiplied signals in each of the dimensions of the coordinate axis system;

sending the counted data to the a micro controller unit (MCU);

adding the counted data for each dimension of the coordinate axis system for each of the multiplied signals in each dimension to obtain an accumulated number in each dimension;

calculating a plurality of coordinate values of the measuring machine according to the accumulated number in each dimension and a proportionality factor of the raster ruler signal generator.

6. The method as claimed in claim 5, further comprising:

determining whether a counted data of each of the multiplied signals in each dimension reaches a value of 256 or a value of −256;

sending the counted data to the MCU via a latch if the counted data counted by the up/down counter does not reach a value of 256 or a value of −256; or sending the counted data to an interrupt input port of the MCU if the counted data counted by the up/down counter reaches a value of 256 or a value of −256.

7. The method as claimed in claim 5, wherein each of the signals received is transmitted in a forward direction or in a backward direction.

8. The method as claimed in claim 7, wherein the counted data of each of the multiplied signals counted by the up/down counter is a negative data if the signal is transmitted in the forward direction; and the counted data of each of the multiplied signals counted by the up/down counter is a positive data if the signal is transmitted in the backward direction.

9. A non-transitory computer readable medium containing computer instructions stored therein for causing a computer processor to perform a method for calculating coordinate values of a measuring machine comprising a raster ruler signal generator, the method comprising:

sending a gathering instruction so as to gather a plurality of signals generated by the raster ruler signal generator, wherein the plurality of signals generated are spread in three dimensions of a coordinate axis system;

resetting a frequency multiplier and an up/down counter according to the gathering instruction;

receiving the plurality of signals generated by the raster ruler signal generator;

identifying a direction of each of the plurality of signals received and multiplying a frequency of each of the signals received by a predetermined number so as to form a plurality of multiplied signals;

sending the plurality of multiplied signals to the up/down counter;

counting each of the plurality of multiplied signals in each dimension of the coordinate axis system so as to form a counted data for each of the plurality of multiplied signals in each of the dimensions of the coordinate axis system;

sending the counted data to the a micro controller unit (MCU);

adding the counted data for each dimension of the coordinate axis system for each of the multiplied signals in each dimension to obtain an accumulated number in each dimension;

calculating a plurality of coordinate values of the measuring machine according to the accumulated number in each dimension and a proportionality factor of the raster ruler signal generator.

* * * * *